(12) United States Patent
Roopnarine

(10) Patent No.: US 9,360,098 B2
(45) Date of Patent: Jun. 7, 2016

(54) STRAIN WAVE DRIVE WITH IMPROVED PERFORMANCE

(71) Applicant: Roopnarine, New York, NY (US)

(72) Inventor: Roopnarine, New York, NY (US)

( * ) Notice: Subject to any disclaimer, the term of this patent is extended or adjusted under 35 U.S.C. 154(b) by 0 days.

(21) Appl. No.: 14/524,206

(22) Filed: Oct. 27, 2014

(65) Prior Publication Data

US 2015/0114174 A1    Apr. 30, 2015

Related U.S. Application Data

(60) Provisional application No. 61/897,123, filed on Oct. 29, 2013.

(51) Int. Cl.
*F16H 37/02* (2006.01)
*F16H 49/00* (2006.01)
*F16H 55/08* (2006.01)

(52) U.S. Cl.
CPC .......... *F16H 49/001* (2013.01); *F16H 55/0833* (2013.01); *F16H 2049/003* (2013.01); *Y10T 74/19* (2015.01)

(58) Field of Classification Search
CPC ...................................................... F16H 49/001
USPC ............................................................ 74/640
See application file for complete search history.

(56) References Cited

U.S. PATENT DOCUMENTS

| 2,906,143 | A | | 9/1959 | Musser | |
| 3,091,979 | A | * | 6/1963 | Jennings | F16H 49/001 464/79 |
| 4,601,216 | A | * | 7/1986 | Inoue | F16H 49/001 74/640 |
| 4,823,638 | A | | 4/1989 | Ishikawa | |
| 4,974,470 | A | | 12/1990 | Ishikawa | |
| 8,661,940 | B2 | | 3/2014 | Ishikawa | |
| 8,776,638 | B2 | | 7/2014 | Ishikawa | |
| 2009/0139357 | A1 | * | 6/2009 | Ishikawa | F16H 55/0833 74/461 |
| 2014/0150586 | A1 | | 6/2014 | Kanai | |
| 2014/0165758 | A1 | | 6/2014 | Moune | |

* cited by examiner

*Primary Examiner* — Ha D Ho
(74) *Attorney, Agent, or Firm* — Leighton K. Chong

(57) ABSTRACT

An improved strain wave drive system employs an outer circular spline part and an outer dynamic spline part spaced apart by a gap from each other in a widthwise (axial) direction and each having a array of internally facing gear teeth, a two-part inner flexible spline (flexspline) having two different sets of externally facing toothed projections offset by a gap from each other across a width extending in a widthwise (axial) direction, a wave generator coupled to the central rotor or shaft for generating a wave impulse that displaces the inner flexspline toothed projections into mesh with those of the outer circular spline part and an array of roller bearings supporting an inner surface across the width of the flexspline in rolling line bearing contact.

16 Claims, 18 Drawing Sheets

STRAIN WAVE DRIVE WITH IMPROVED PERFORMANCE

This U.S. patent application claims the priority filing benefit of U.S. Provisional Application 61/897,123 filed on Oct. 29, 2013, of the same inventor.

FIELD OF INVENTION

The subject matter disclosed herein generally relates to a type of geared transmission known as a wave gear drive or a strain wave drive and sometimes as a harmonic drive. Particularly, it is directed to a strain wave drive using a flexible spline gear.

BACKGROUND ART

The detailed theory and operation of strain wave gearing are disclosed in U.S. Pat. No. 2,906,143 of Musser. As illustrated in FIGS. 1a-1b representing the prior art, a typical strain wave gearing 1 comprises a rigid circular spline 2, a flexible flexspline 3 disposed inside the circular spline 2, and a wave generator 4 of an elliptic configuration which fits in the flexspline 3 to deform the flexspline into an ellipsoid. The wave generator 4 includes an inner cam plate 5 of an elliptic profile and a flexible ball bearing 6 fittingly mounted on the periphery of the cam plate 5 to deform the bearing into an ellipsoid. The bearing 6 has an outer race 7 which fits in the flexspline 3. The flexspline is deformed into an ellipsoid by the wave generator 4 so that the flexspline is engaged with the circular spline 2 at two points on the major axis of the ellipsoid and the adjacent regions thereof. In FIG. 1a, the engagement points are illustrated as two points shown by arrows A and B. By virtue of the ball-bearing 6 of the wave generator 4, the ellipsoid of the flexspline 3 is rotated when the cam plate 5 is rotated, but the flexspline 3 is not directly rotated by the plate.

A strain wave drive with a modified type of gearing has been developed in the prior art as shown in FIG. 1b. The strain wave gearing 10 comprises a first circular spline 11 (also referred to herein as "dynamic spline"), a second circular spline 12 which is juxtaposed with the first circular spline along the axis of the first circular spline and having a different number of teeth from that of the first circular spline, a flexspline 13 disposed coaxially inside both circular splines and having the same number of teeth as the first circular (dynamic) spline, and a wave generator 14 for deforming the flexspline 13 into a non-circular, elliptical, configuration to bring the flexspline into partial engagement with the teeth of each of the first and second circular splines and for rotating the deformed configuration of the flexspline to produce a relative rotation between the first and second circular splines. The strain wave gearing 10 is made thin and flat as a whole because the circular splines 11 and 12 are juxtaposed with each other, and the flexspline is made in a circular shape. This type of strain wave gearing is referred to as "flat-shaped strain wave gearing" or "pancake" strain wave gear set.

In the flat-shaped strain wave gearing, the wave generator 14 deforms the flexspline 13 into an ellipsoid and rotates the deformed configuration of the flexspline. By the rotation of the wave generator 14, the engagement points of the flexspline 13 and the first circular spline 11, and the flexspline 13 and the second circular spline 12 are also rotated. As mentioned above, the number of teeth of the flexspline 13 is equal to that of the first circular or dynamic spline 11. Therefore, even if the configuration of the flexspline is rotated, there is no relative rotation between the flexspline 13 and the first circular spline 11. As the number of teeth of the flexspline 13 is different from that of the second circular (dynamic) spline 12, the first circular spline 11 is rotated relative to the second circular spline 12. Thus, in the case where an input shaft is mounted on the wave generator, one of the circular splines is fixed stationarily and an output shaft is attached to the other circular spline, so that relative rotation is obtained between the stationary part and the output shaft. For a further explanation of the flat-type strain wave gearing of the prior art, incorporation by reference is made to U.S. Pat. No. 4,974,470 to Ishikawa.

Another known type of strain wave gearing is cup-shaped strain wave gearing, in which a cup-shaped flexspline extends in a direction normal to the plane of the splines and one of the ends is closed to form a cup shape. Since the flexspline is made in a cup shape, however, it is disadvantageous in that the overall size of the gearing becomes larger and thus occupies more volume. However, their main advantage is that they are capable of being radially preloaded in order to reduce backlash at the meshing teeth. Cup type strain wave drives do not typically have a first circular or dynamic spline and the output is taken directly from the closed cup-shaped end of the flexspline. Thus, supporting the flexspline in a rigid manner becomes an important factor in the design of a housing for a drive train that incorporates a cup type strain wave drive. For a further explanation of the cup-shaped type of strain wave drives of the prior art, incorporation by reference is made to U.S. Pat. No. 4,823,638 to Ishikawa. Reference is also made to U.S. Pat. Nos. 8,776,638 and 8,661,940 of Ishikawa, and U.S. Published Application 2014-0150586 of Kanai, for detailed descriptions of recent improvements in the two types of strain wave drives.

It is known that the primary reason for failure of strain wave drives is ratcheting due to excessive torque loads. This is caused when the engaged gear teeth slip, i.e., ratchet, over each other, creating an offset between the centers of the drive's flexspline and the circular spline, that is, they become non-concentric. This, ultimately, results in failure of the drive from fatigue or, at minimum, a shortened life because of excessive teeth wear in mesh no longer as designed. It is therefore a primary object of the present invention to improve the torque capacity of a strain wave drive and to prevent ratcheting of the gearing.

SUMMARY OF INVENTION

An improved strain wave drive system comprises:

an outer circular spline part and an outer dynamic spline part spaced apart by a gap from each other in a widthwise (axial) direction and each having an array of internally facing gear teeth of predetermined and different numbers, a two-part inner flexible spline (flexspline) having two different sets of externally facing toothed projections offset by a gap from each other across a width extending in a widthwise (axial) direction, a wave generator coupled to the central rotor or shaft for generating a wave impulse that displaces the inner flexspline toothed projections into mesh with those of the outer circular spline part and the outer dynamic spline part, and an array of roller bearings supporting an inner surface across the width of the flexspline in rolling line bearing contact.

The improved strain wave drive system improves on the prior art by replacing the ball bearing assembly with a roller bearing assembly. This offers the following advantages: (1) the support of the flexspline is improved because the contact with the bearing race is a line contact with cylindrical rollers versus point contact with spherical ball bearings; and (2) due to the roller bearings, the stresses and, more importantly, the deflection forces in the system are better distributed. Because the deflection across the major diameter of the flexspline directly affects teeth engagement and interaction, the roller bearing line contact is advantageous because it translates to full line contact across the flexspline gear face width. In the prior art, the local deflection at the points of contact (across the major axis of the plug) are likely to be arched across the face width of the flexspline teeth (because of the curvature of the spherical ball bearings) under heavy loads, thereby leading to stress concentrations, teeth disengagement, slip and ratcheting. In other words, the roller bearing assembly is used to cause the strain wave action to occur in fully supported contact between the wave generator and the flexspline gear elements in a compact manner.

Further improvements are provided by variations of different flexspline first and second part tooth numbers, tooth shapes and profiles. In the prior art, each of the geared components has the same and constant tooth profile and shape across its face width. While Musser's U.S. Pat. No. 2,906,143 discloses the possibility of a single flexspline with two different tooth segments in contact with two different circular splines, the purpose of the arrangement was to achieve dramatic gear reductions by employing differential strain wave action at both sets of toothed interfaces. As a consequence, the potential variations in the tooth geometries can only be minimal particularly if a single wave generator is to be used and the system is still rendered susceptible to ratcheting or tooth slip. In the improved system, the flexspline has two distinct parts with different tooth numbers, shapes and/or profiles and strain wave action occurs at only one of the toothed interface, specifically, with the circular spline. The improved invention does not contemplate the possibility of strain wave action occurring at both toothed segments as this limits the potential profiles of the toothed segment of the flexspline that interfaces with the dynamic spline. This is a key aspect of the invention because the elimination of strain wave action between the flexspline and dynamic spline is the primary means by which resistance to ratcheting (or tooth slip) is achieved. According to the invention, therefore, the flexspline which is a single part, is divided into two distinct face widths or toothed segments only one of which provides strain wave action (in contact with the circular spline) and the other essentially provides a means of rotationally keying the flexspline to a shaft or housing via the dynamic spline.

Other objects, features, and advantages of the present invention will be explained in the following detailed description of a preferred embodiment with reference to the appended drawings.

BRIEF DESCRIPTION OF DRAWINGS

FIG. 4b is a view of Detail A in FIG. 4a.

FIG. 5b is a view of Detail A in FIG. 5a.

DETAILED DESCRIPTION OF PREFERRED EMBODIMENTS

In the following detailed description of the subject matter hereof, one or more preferred embodiments are illustrated with certain specific details of implementation. However, it will be recognized by one skilled in the art that many other variations and modifications may be made and/or practiced in analogous applications or environments. It should be noted that methods, procedures, components, or functions that are commonly known to persons of ordinary skill in the field of the invention are not described in detail herein so as avoid unnecessarily obscuring a concise description of the preferred embodiment. Furthermore, it is understood that the profile and shape of the contacting teeth in mesh between the flexspline and circular spline, at which strain wave action occurs, is well established in the prior art and related literature.

In each design of the flexspline following, the gap for the two flexspline sections or segments is designed to allow manufacturing of the part without any interference in either the machining process or of the two types of teeth. Clearly, one section of the teeth (the section that engages and interfaces with the circular spline) needs to be fine pitched and profiled in order to allow the strain wave action to occur (as is well established in the prior art)—that is, for the movement of the wave generator to engage and disengage teeth. However, the second section of teeth (the section that engages and interfaces with the dynamic spline) need not have the same profile as the first section nor does the profile have to be that of a gear, for example and as noted, it could be splined. The interface between these two parts can also be such that the flexspline is axially slotted around its circumference (over its dynamic spline face width) which would then mate with protrusions (teeth) on the dynamic spline. These slots can be open or closed on the end of the flexspline. If gear teeth are used, they could be stub gears or truncated gears. The use of a spline or any variations on a gear tooth profile is possible because the dynamic spline and the flexspline have the same number of teeth and move together, that is, there is no rotational differential motion between these two parts as there is between the circular spline and flexspline.

Figure 1A:
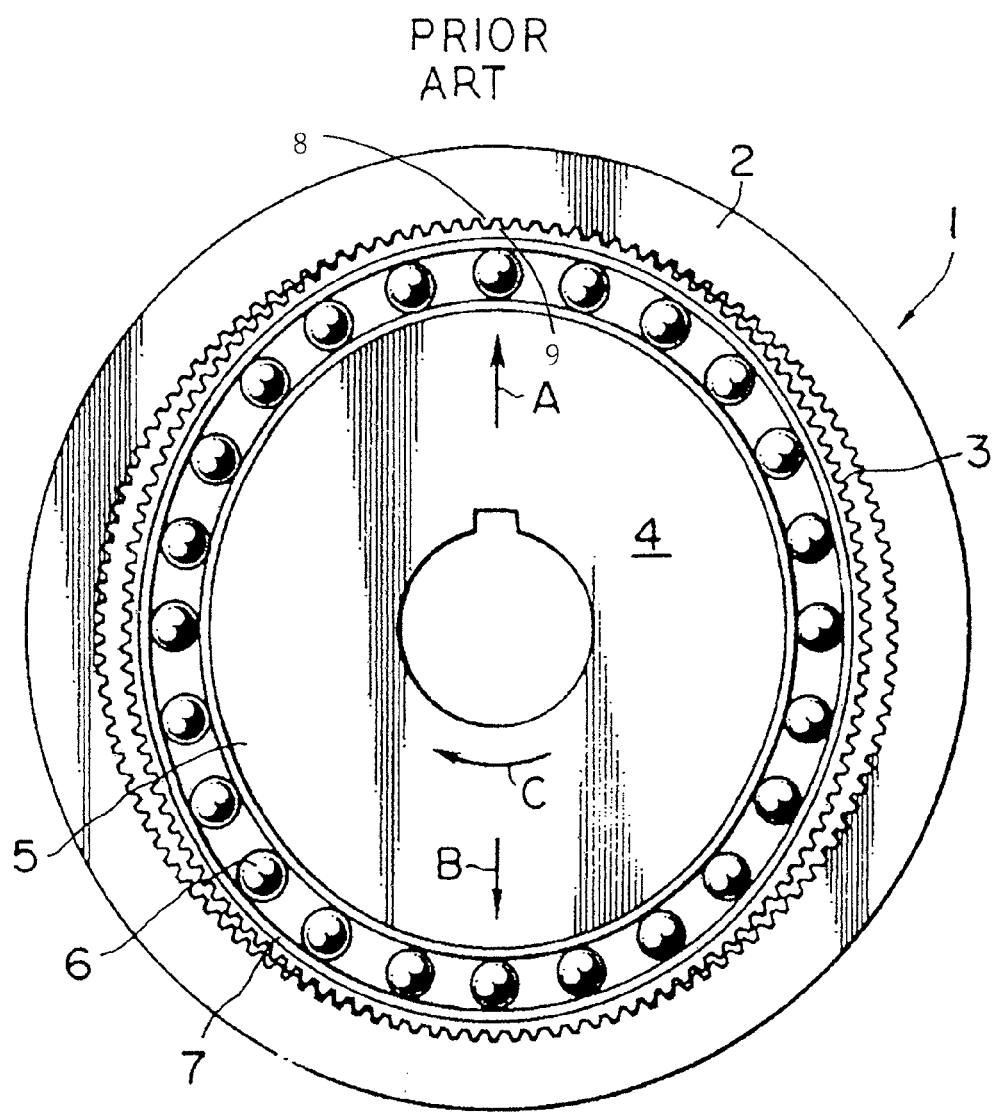
FIG. 1a is a schematic illustration in frontal cross-section of a strain wave drive of the prior art.
Figure 1B:
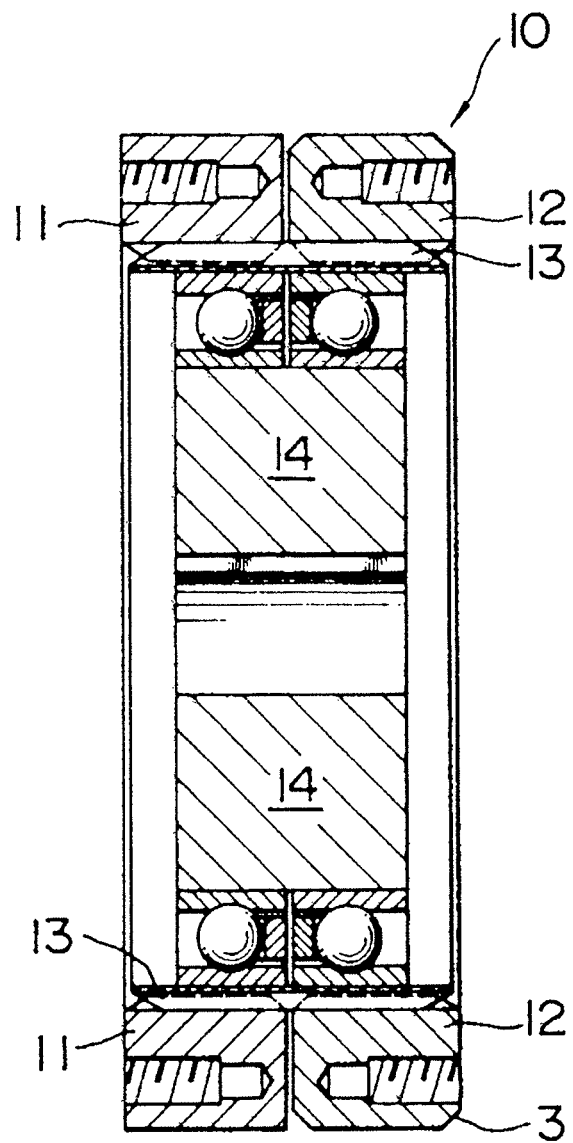
FIG. 1b shows a cross-sectional view of the flat type arrangement of the prior art.
Figure 2A:
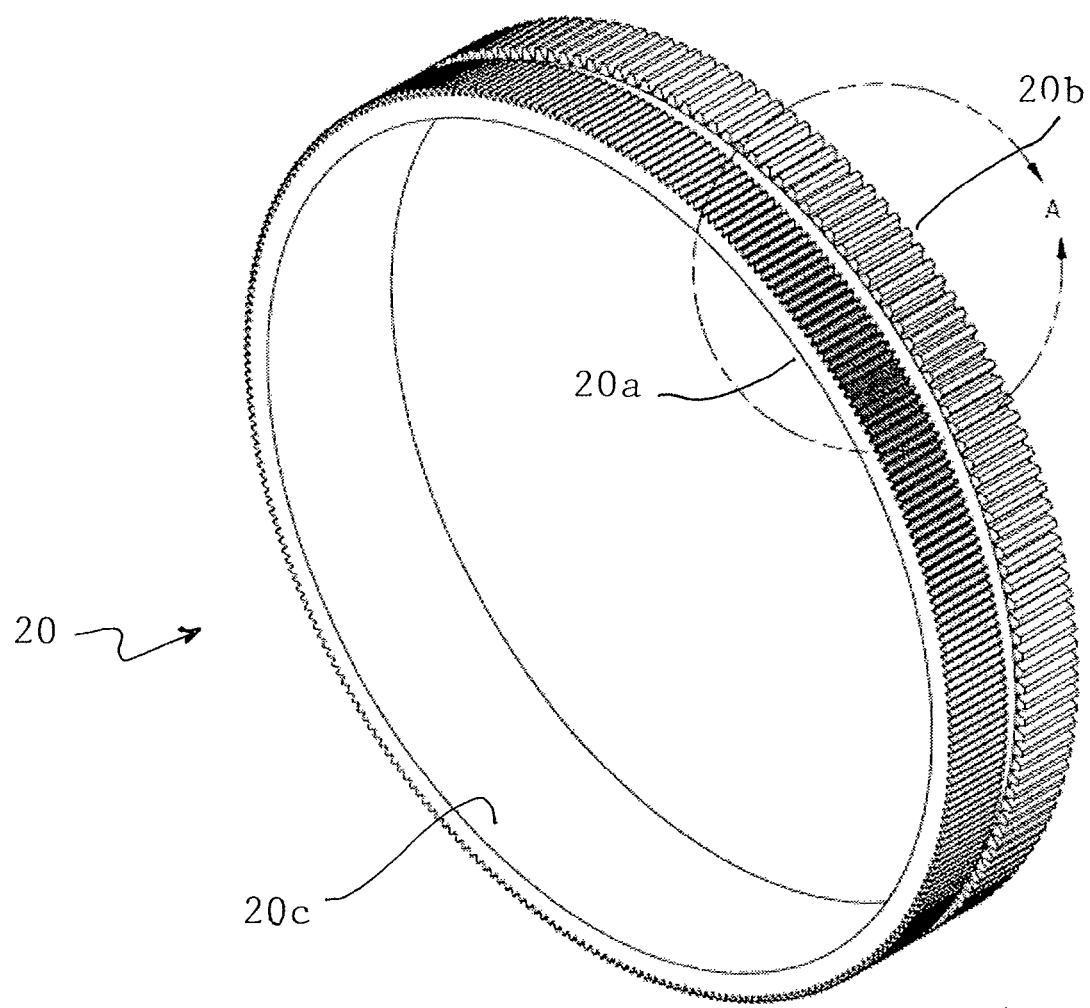
FIG. 2a is an isometric view of an improved flexspline according to the present invention.
Figure 2B:
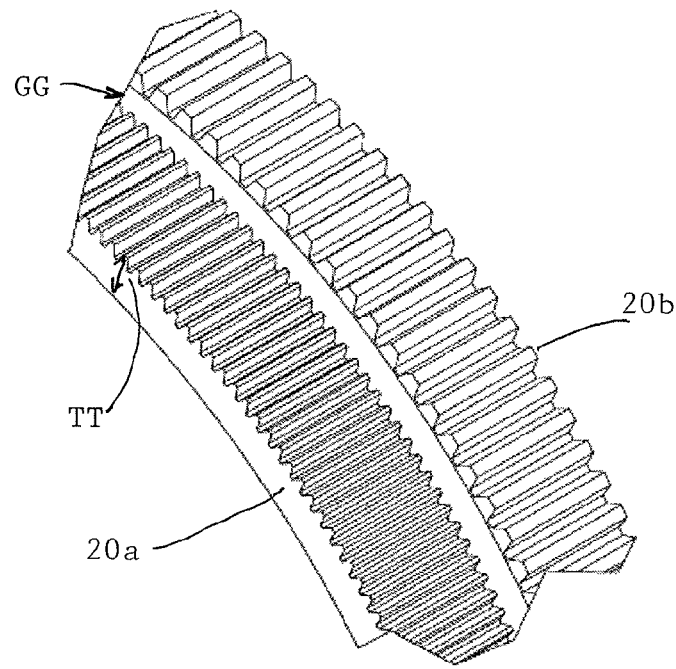
FIG. 2b shows Detail A of FIG. 2a with two sets of different tooth geometries.
Figure 2C:
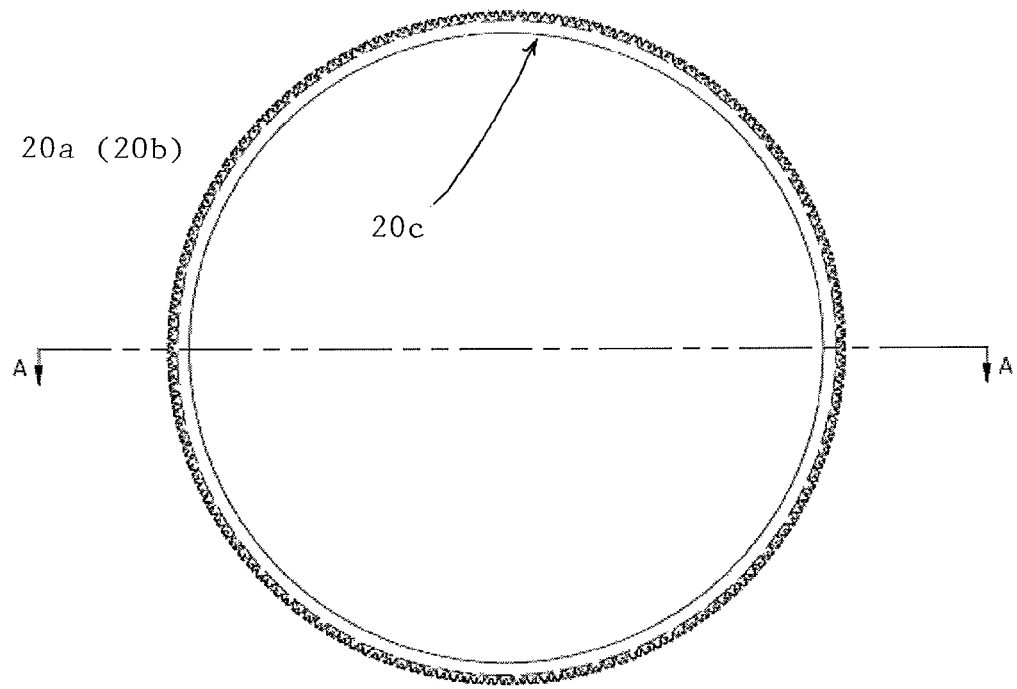
FIG. 2c is an end view of the flexspline.
Figure 2D:
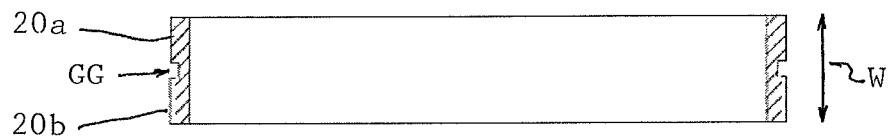
FIG. 2d is a sectional view of the flexspline taken along Section A-A in FIG. 2c.
Figure 2E:
FIG. 2e is a side view of the flexspline showing the two sets of different tooth geometries.

FIG. 2a is an isometric view of a first implementation of an improved flexspline according to the present invention formed as a single gear part 20 with two distinct circular arrays of gear teeth projections, Gear 20a and Gear 20b, which are spaced in widthwise offset from each other for engagement with the gear teeth of the circular spline. FIG. 2b shows Detail A of FIG. 2a with Gear 20a and Gear 20b having two sets of different tooth geometries. FIG. 2c shows an end view of the improved flexspline. The inner annular surface 20c of the flexspline is supported on a thin-walled race of roller bearings (described below). FIG. 2d shows a sectional view of the flexspline taken along Section A-A in FIG. 2c. The Gear 20a is offset from the Gear 20b in a widthwise direction W, separated by the gap GG. FIG. 2e is a side view of the flexspline showing the two sets of different tooth geometries. Gear 20b may be formed from an involute profile and may be truncated at its addendum or undercut at its dedendum in order to preserve the elasticity of the flexspline. Preserving the elasticity of the flexspline and by extension, its fatigue strength, is the predominant factor that will determine the pitch of the involute profile used. For instance, a coarse-pitched gear (diametral pitch of 48 or lower) will require undercutting and/or truncation of the addendum. The single flexspline part 20 has an inner annular surface 20c that is supported on a thin-walled race of roller bearings (described below).

Figure 3A:
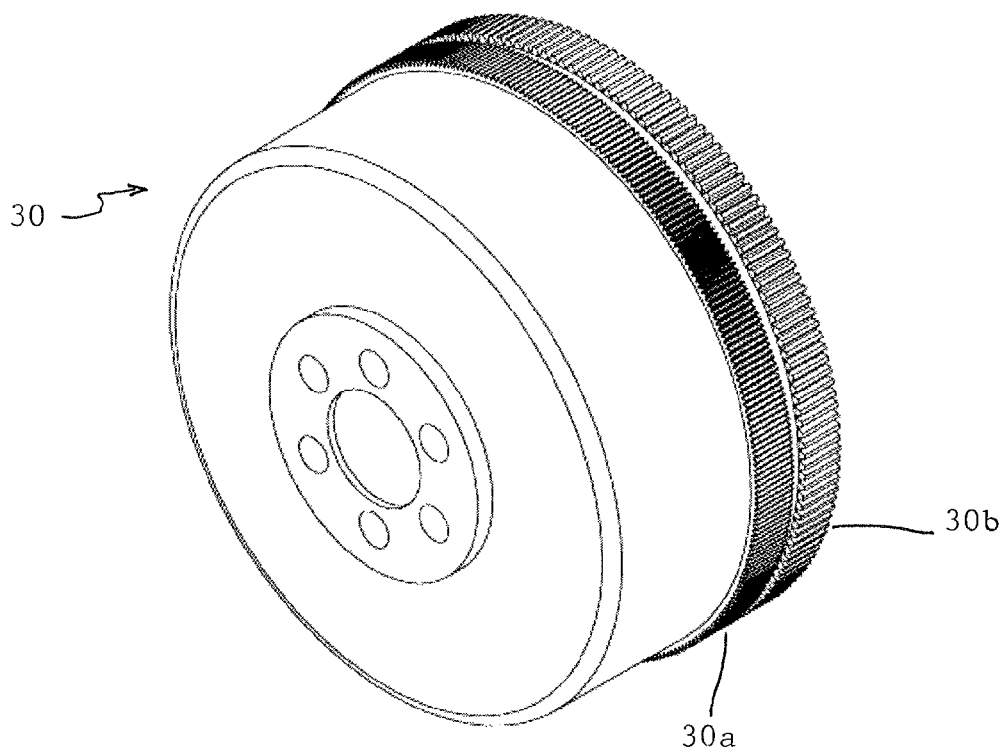
FIGS. 3a and 3b are isometric views of a "cup" type flexspline in the improved strain wave drive system.
Figure 3B:
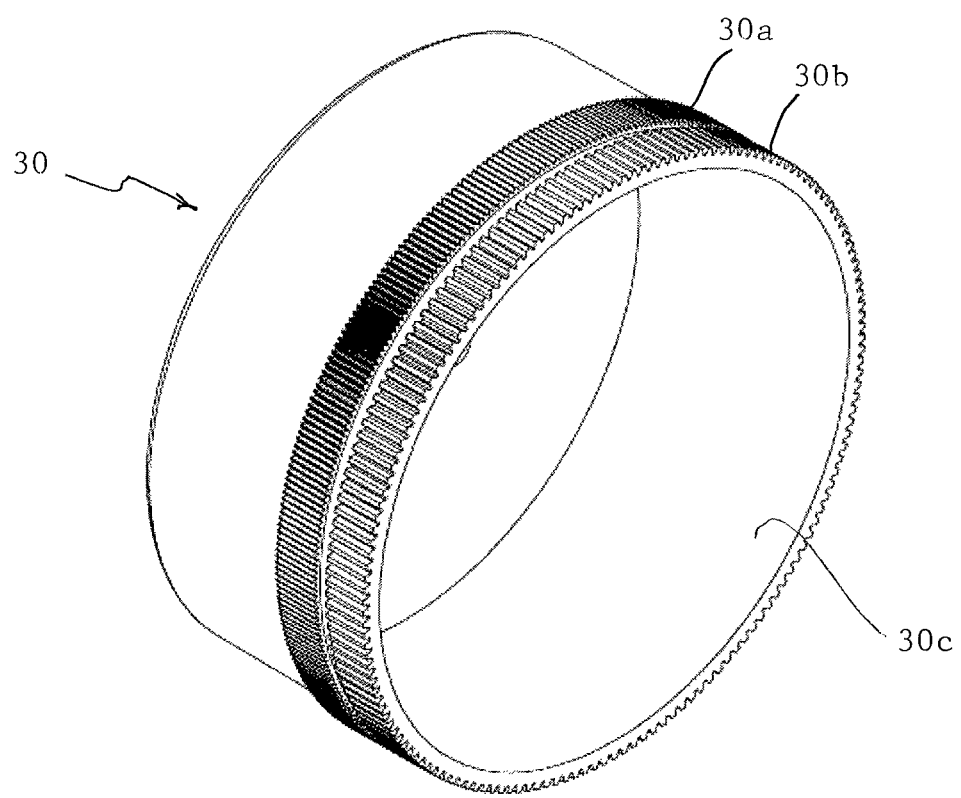
Figure 3C:
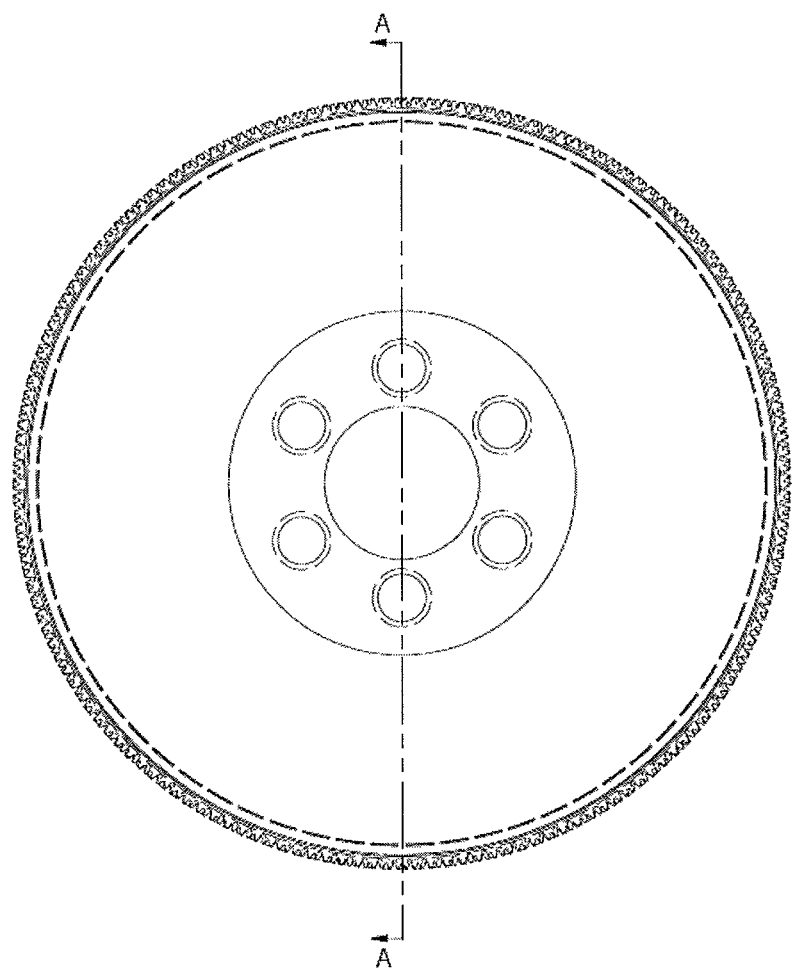
FIG. 3c is an end view of the cup-type configuration.
Figure 3D:
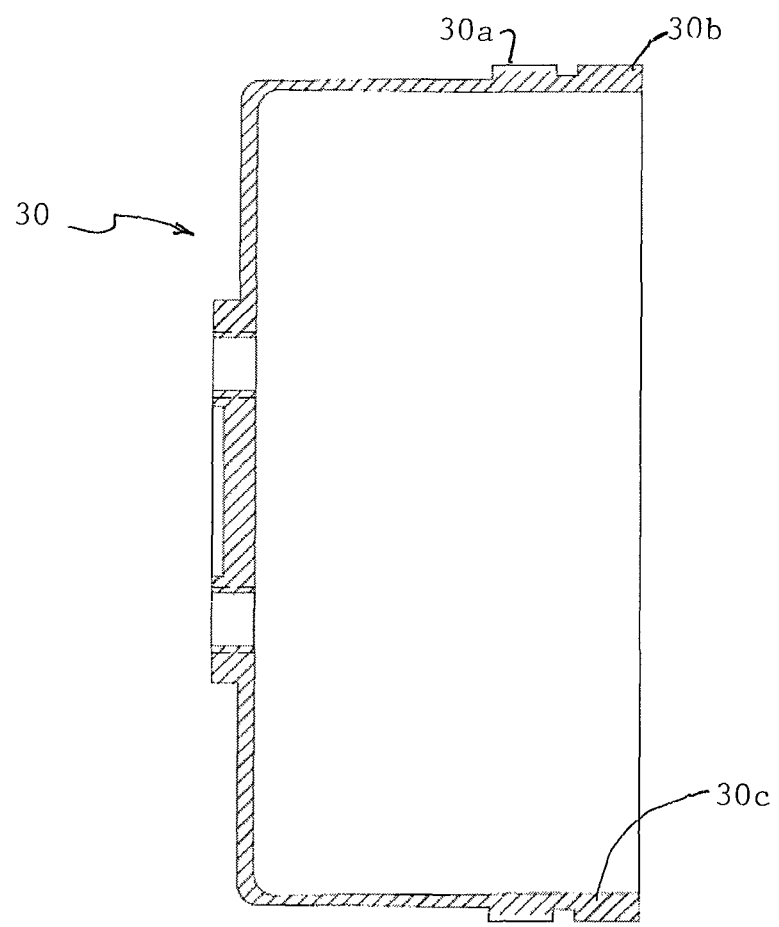
FIG. 3d is a sectional view of the flexspline taken along Section A-A in FIG. 3c.

FIGS. 3a and 3b are isometric views of a "cup" type flexspline in the improved strain wave drive system. The flexspline having two sets of gear arrays 30a and 30b are formed on the open end of the cup-shaped housing part 30. FIG. 3c is an end view of the cup-type flexspline configuration. FIG. 3d shows a sectional view taken of Section A-A in FIG. 3c. The relative location of the two types of gear tooth profiles can be interchanged depending on the application and packaging options. The single flexspline part 30 has an inner annular surface 30c that is supported on a thin-walled race of roller bearings (described below).

Figure 4A:
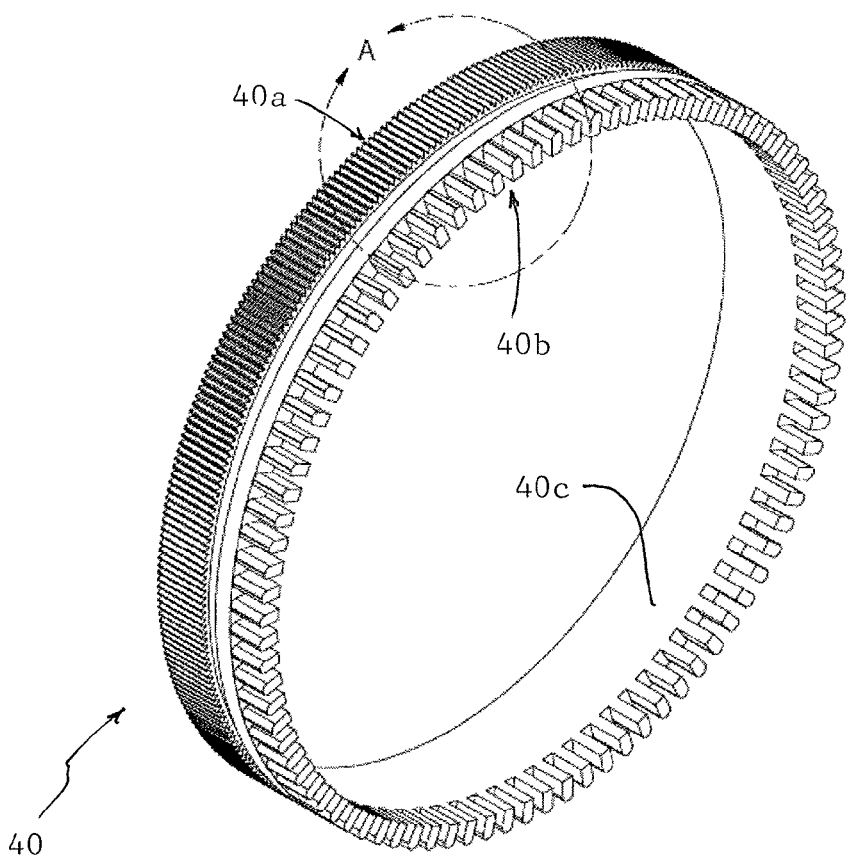
FIG. 4a shows another implementation of the improved flexspline with sets of toothed projections of different profiles.
Figure 4B:
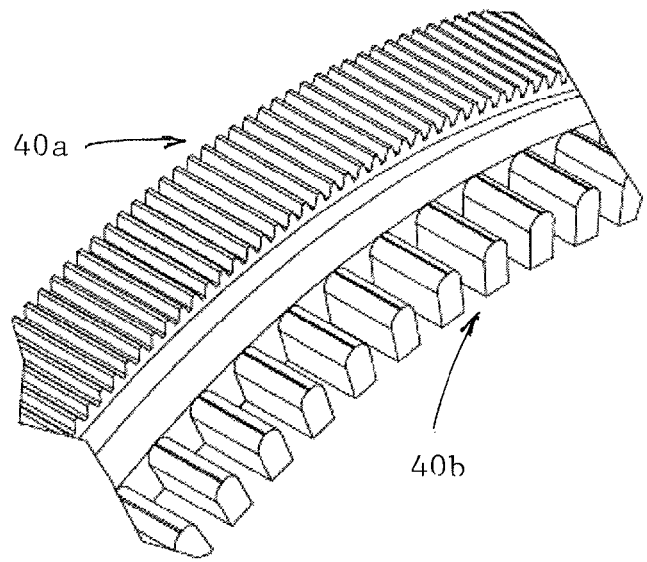

FIG. 4a shows another implementation of the improved flexspline with two sets 40a and 40b of toothed projections of different profiles. In this version, the inner surface 40c of the flexspline is formed in part by the serrations of the gear set 40b. The toothed projections may be formed from straight line, arc segments, tapered or involute profiles. FIG. 4b is a view of Detail A in FIG. 4a showing the tip projections formed from arc segments. The single flexspline part 40 has an inner annular surface 40c that is supported on a thin-walled race of roller bearings (described below).

Figure 5A:
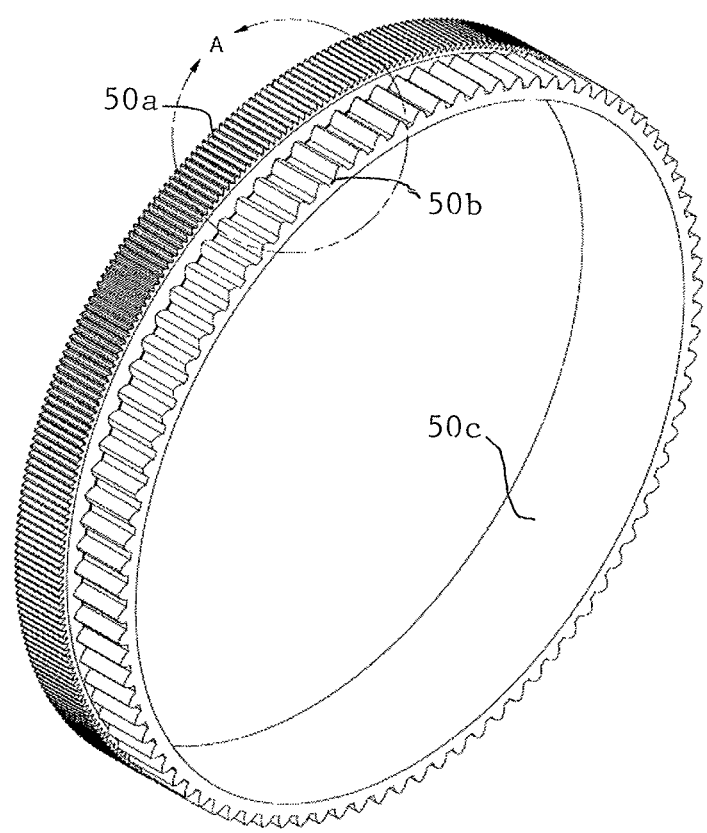
FIG. 5a shows another implementation of the improved flexspline.
Figure 5B:
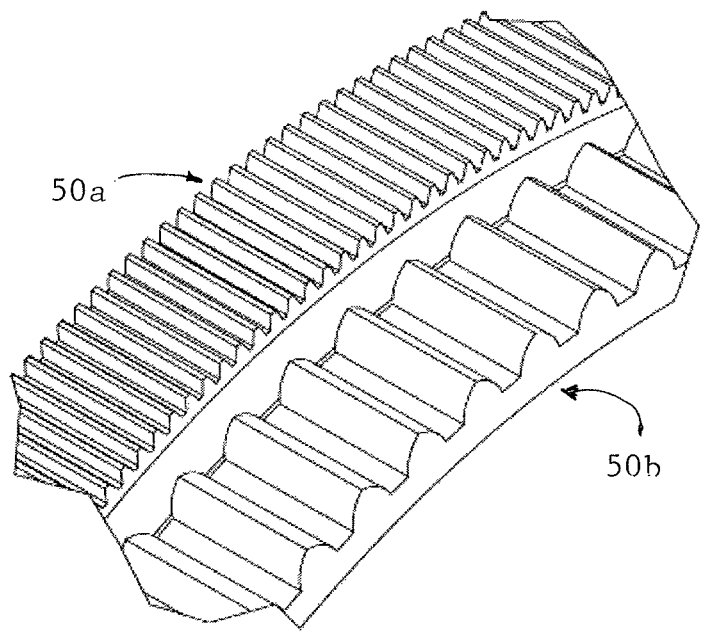

FIG. 5a shows an implementation of the invention in which the contact between the dynamic and flex splines occurs via a spline. The single flexspline part 50 has two sets of gear arrays 50a and 50b and an inner annular surface 50c that is supported on a thin-walled race of roller bearings (described below). FIG. 5b is a close-up view of Detail A in FIG. 5a showing the splined feature. Each projection or tooth of the splined feature is formed from arc segments that are symmetrical about a radial line through the center of the flexspline. Clearly, straight line segments may be used to form projections that are rectangular or triangular.

Figure 6A:
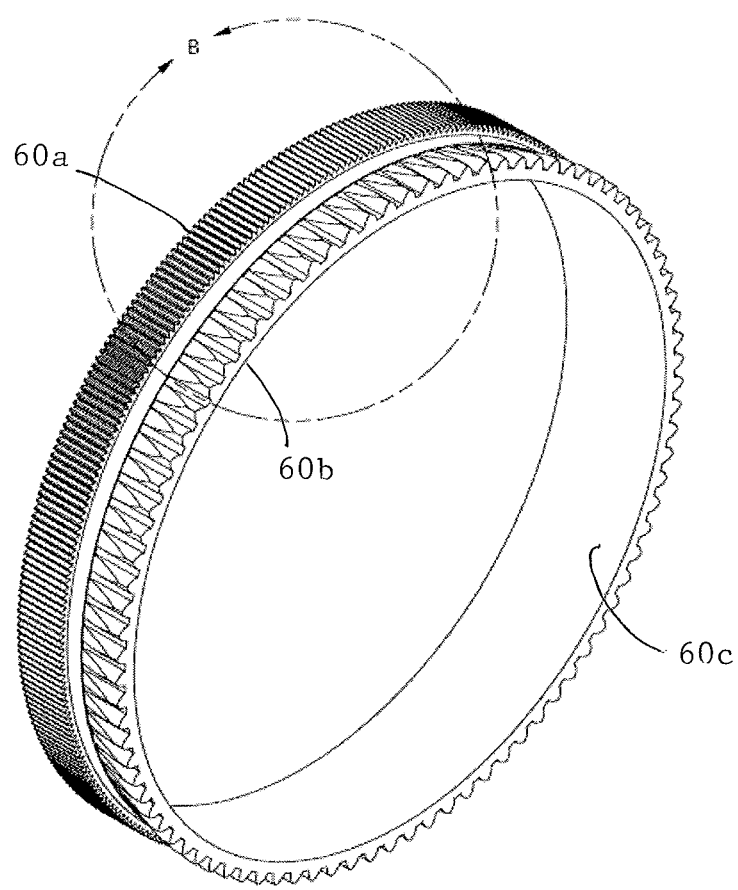
FIG. 6a depicts another implementation of the improved flexspline.
Figure 6B:
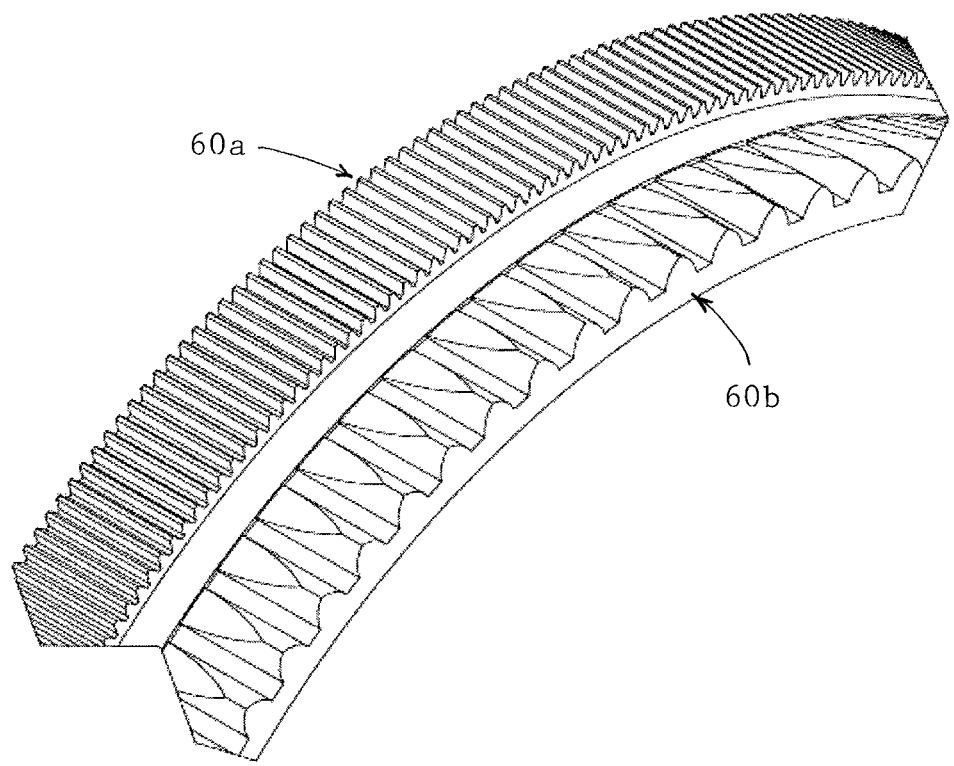
FIG. 6b is a view of Detail B in FIG. 6a showing a close-up view of the gear tooth taper.
Figure 6C:
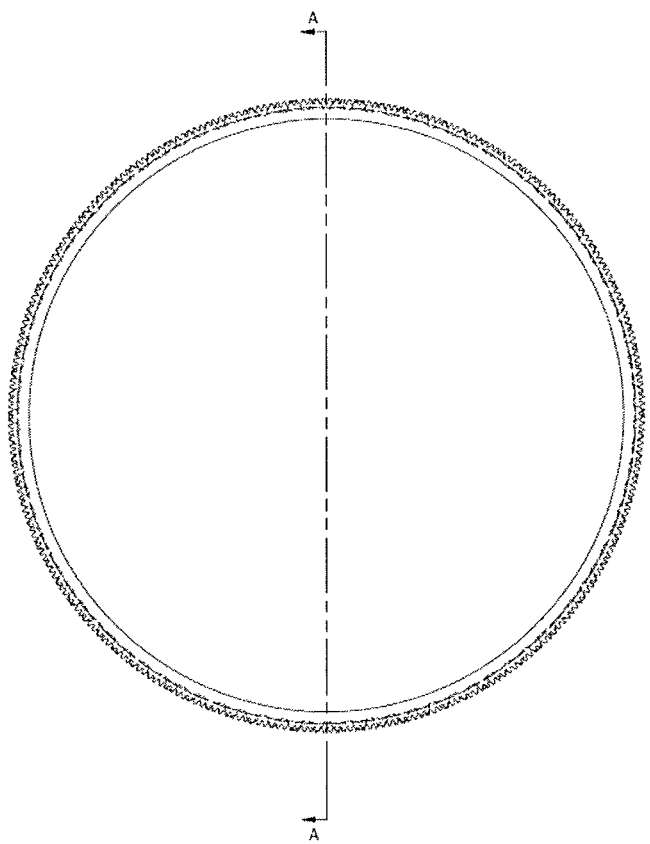
FIG. 6c is an end view of the flexspline.
Figure 6D:
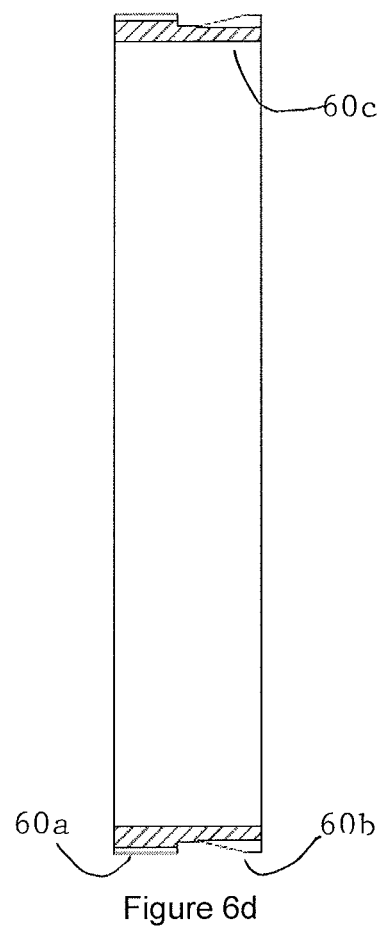
FIG. 6d is sectional view taken along Section A-A in FIG. 6c.

FIG. 6a depicts another implementation of the improved flexspline in which the contacting projections with the dynamic spline are formed from teeth or projections of any type (such as described in the previous figures) with a slight axial taper to enable radially preloading the contact between the two parts. The single flexspline part 60 has two sets of gear arrays 60a and 60b and an inner annular surface 60c that is supported on a thin-walled race of roller bearings (described below). The taper is such that when the dynamic spline, with its oppositely shaped projections or teeth, is shifted axially (away from the circular spline), there is a decrease in clearance between its teeth and those of the flexspline. Thus, a radial preload can be achieved as a means of reducing backlash in the gear mesh. FIG. 6b is a view showing Detail B of FIG. 6a with a close-up view of the taper. FIG. 6c is an end view of the flexspline. FIG. 6d is a sectional view of Section A-A in FIG. 6c showing the taper in the axial direction, the undercut and the geared section for strain wave action.

Figure 7A:
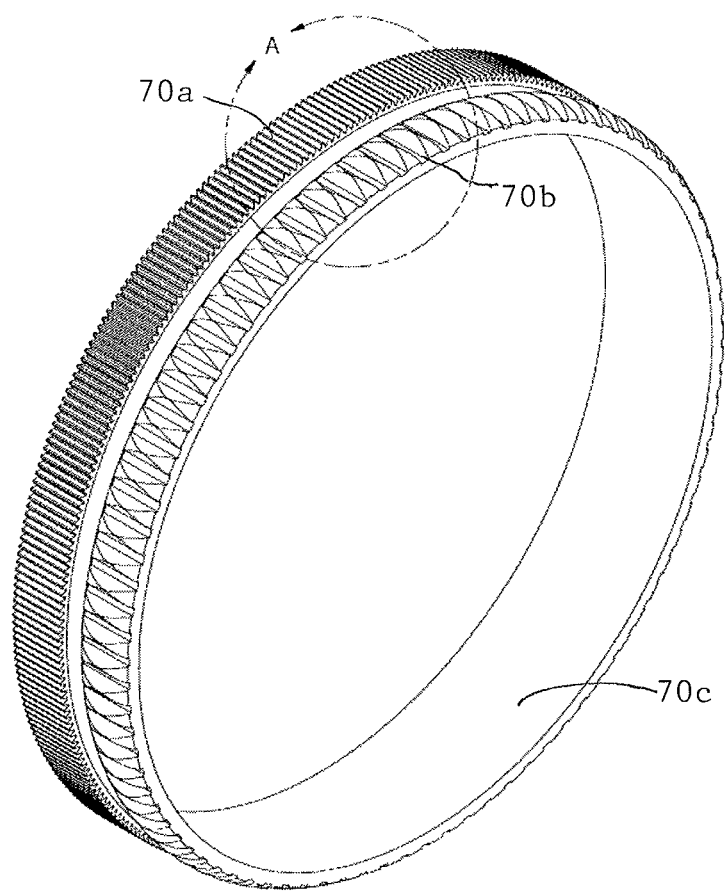
FIG. 7a depicts another implementation of the improved flexspline with radiused toothed projections.
Figure 7B:
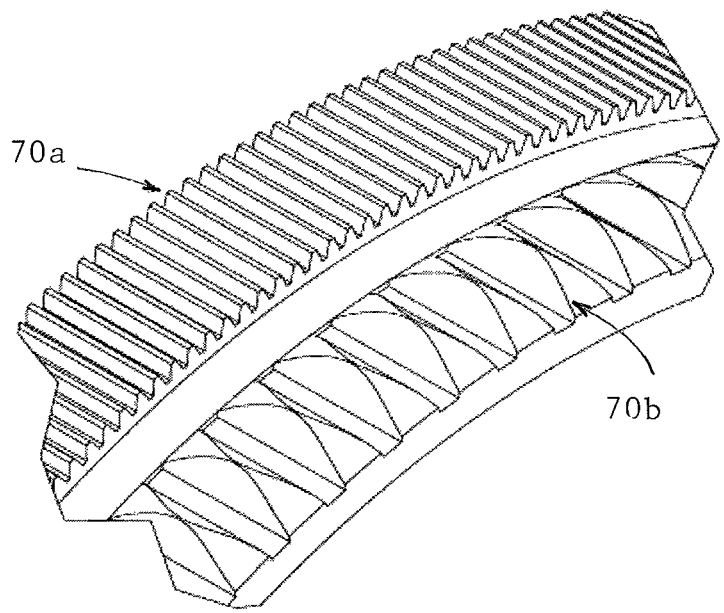
FIG. 7b is a view of Detail A in FIG. 7a, FIG. 7c is an end view of the flexspline.
Figure 7C:
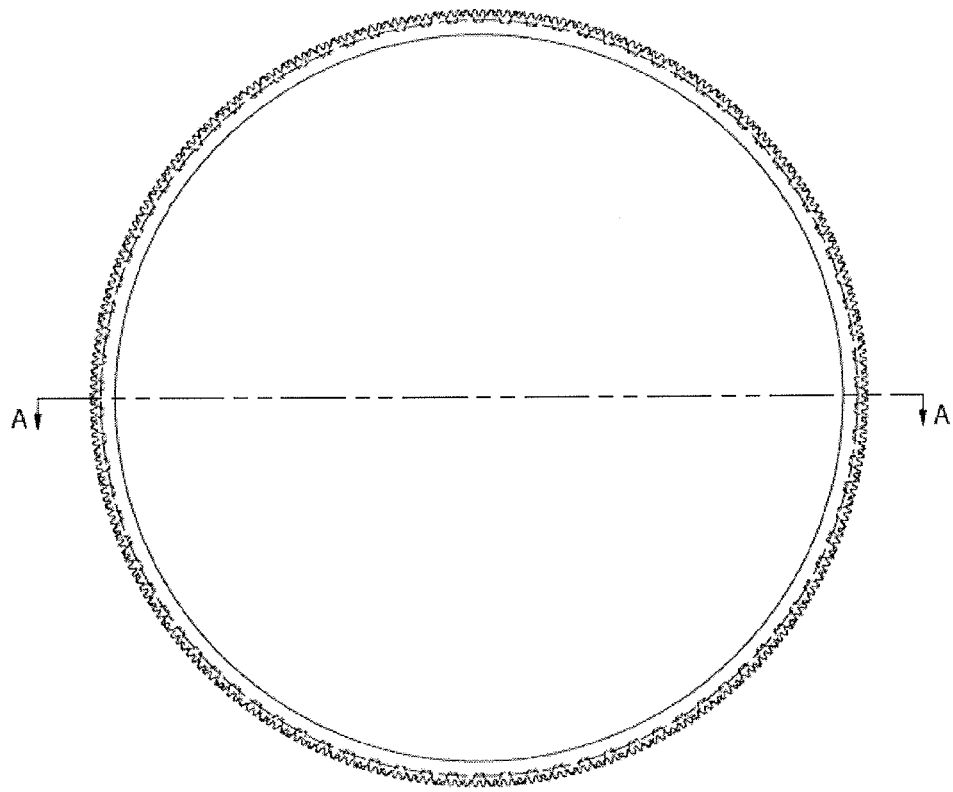
FIG. 7d is sectional view taken along Section A-A in FIG. 7c.
Figure 7D:
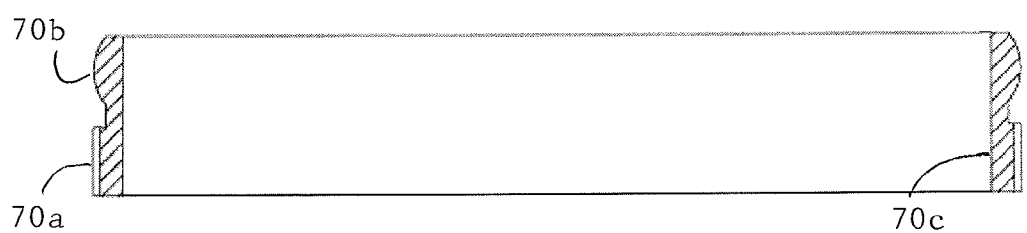

FIG. 7a depicts another implementation of the improved flexspline with radiused toothed projections. The single flexspline part 70 has two sets of gear arrays 70a and 70b and an inner annular surface 70c that is supported on a thin-walled race of roller bearings (described below). The radial toothed projections have radiuses at the longitudinal ends of the teeth. The radiuses may or may not be symmetrical about the face width of the teeth. The radiused toothed feature operates in a manner similar to the tapered teeth or projections described above, that is, as a means for reducing backlash by axially shifting or positioning the dynamic spline. FIG. 7b shows a view of Detail A in FIG. 7a with a close-up view of the radiused projections or teeth. FIG. 7c is an end view of this version of the flexspline. FIG. 7d is a sectional view of Section A-A in FIG. 7c depicting the radiused ends of the tooth projections.

Figure 8A:
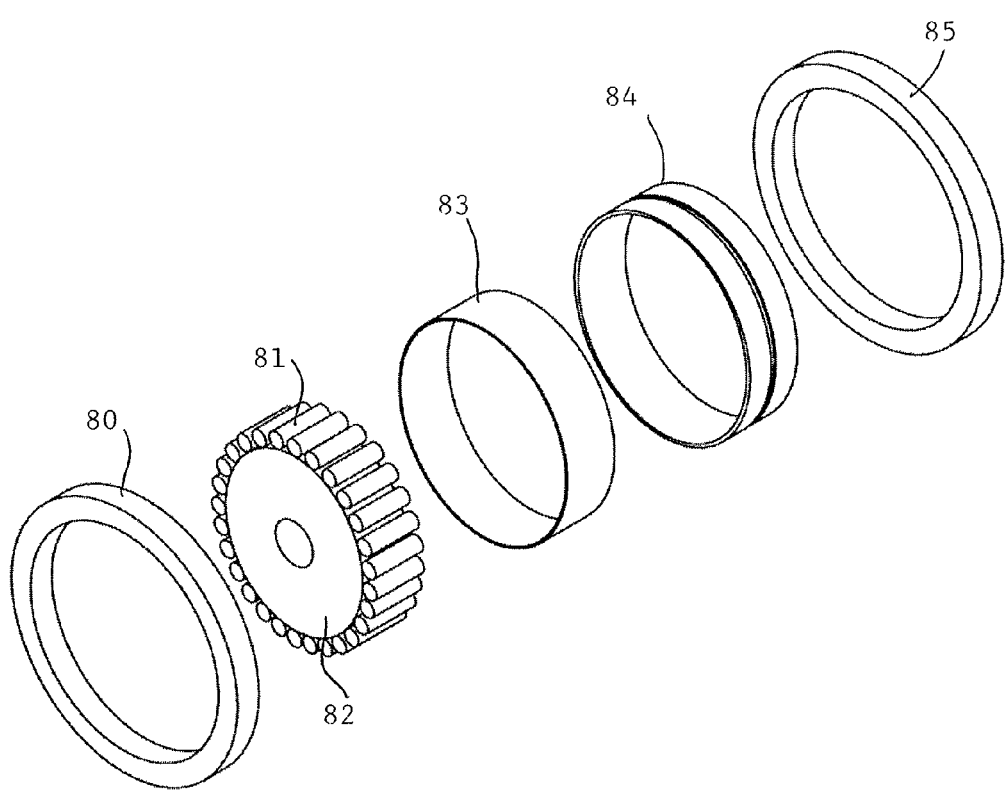
FIG. 8a is a fully exploded view of the improved strain wave drive system showing its components.
Figure 8B:
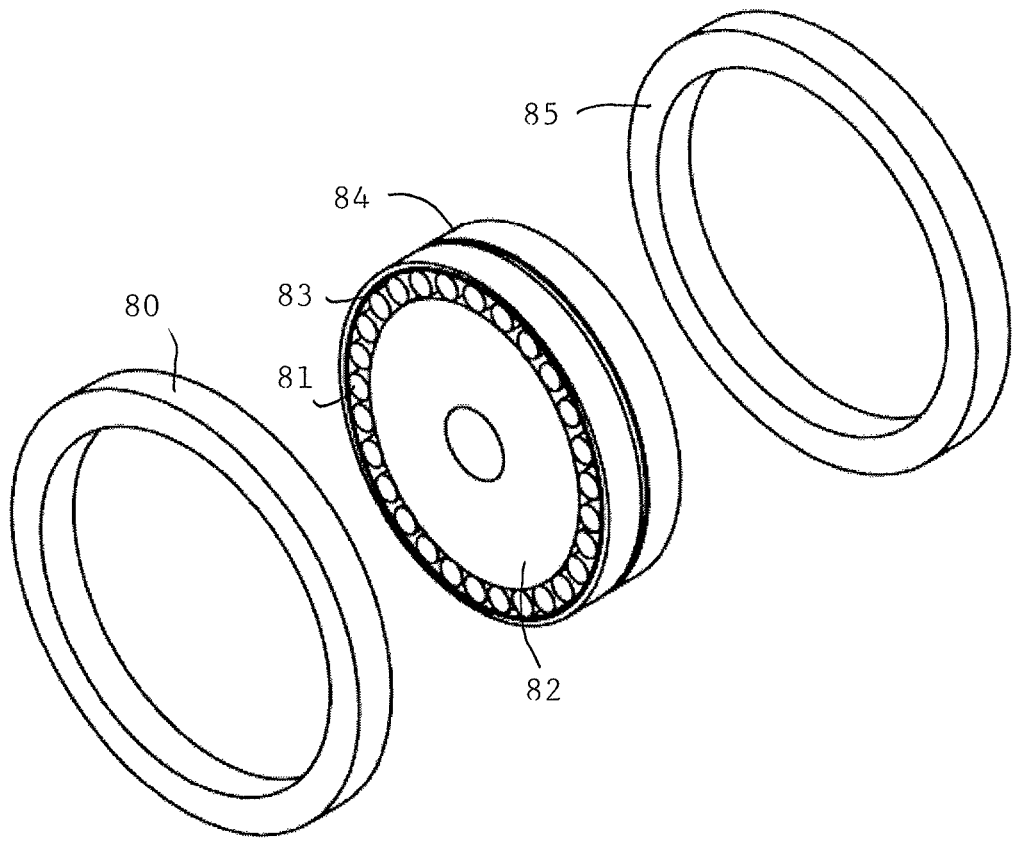
FIG. 8b is a partially assembled view of the improved strain wave drive.
Figure 8C:
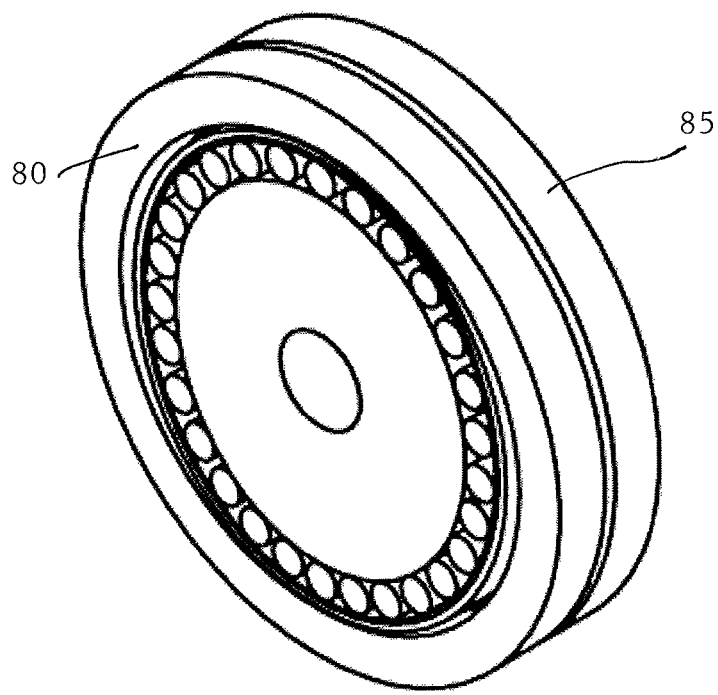
FIG. 8c is a fully assembled view of the improved strain wave drive.

FIG. 8a is a fully exploded view of the improved strain wave drive system showing the components of front circular spline 80, roller bearings supported on elliptical center plug 82, outer race 83 for the bearings, flexspline 84, and rear dynamic spline 85. The teeth or projections of the various splines (circular, dynamic and flexible) are not depicted in this figure but are understood to be as described above. The cage or retainer for the roller bearing is also not shown in the figure. FIG. 8b shows a partially assembled view of the improved strain wave drive, showing the flexspline, elliptical plug and roller bearings assembled as a single strain wave generator system. FIG. 8c shows a fully assembled view of the improved strain wave drive in which the two flexspline sections are separated by a thin gap that is not toothed or that is undercut.

Advantages of Invention Over Prior Art Designs

The feature of the flexspline having two different toothed sections or segments of tooth profiles provides the following advantages: (1) the profile can be of almost any shape as long as it does not affect the overall flexibility or elasticity of the flexspline; (2) the pitch of the gear or spline can be much coarser than that required for the strain wave action, that is, at the flexspline to circular spline engagement and interface; (3) the coarser pitched gears provide better torsional rigidity; and (4) in the prior art, because of the tooth count difference between the circular and dynamic splines and the fact that both of these have to mesh with the same tooth profile on the flexspline, then for the same pitch diameter, one of the gear tooth profile (either on the circular or flexspline) needs to be undercut. This last item is significant in that it clearly reduces the potential engagement at either one of the interfaces with the flexspline. The consequences of this ripple through the design of the prior art. The coarser pitched and separate gear or spline provides better engagement between the flexspline and dynamic spline and is thus capable of providing better load distribution, torsional rigidity and resistance against ratcheting. For reference, relative to the pitch of a state-of-the-art strain wave gear drive, diametral pitches of standard gears ranging from 2-80 will be considered "coarse." Pitches ranging from 32-80 are likely best suited for the flexspline and dynamic spline interface.

As noted earlier, existing cup-styled wave drive gearing do not have a dynamic spline. As a result, these units have a relatively complicated system of supporting and locating the flexspline in order to couple it to either a driven or driver component. The improved flexspline provides a dynamic spline in the cup-type or pancake-type design. The inclusion of this component offers a more robust construction and completely isolates the flexspline from all loading but that of the strain wave action. The dynamic spline is a rigid member and is therefore capable of being better supported structurally. The improvements described above can be implemented separately and are independent from each other; each would offer the advantages noted. A drive assembly that features all three of these improvements, however, will obviously yield all of the advantages in a single product.

Many modifications and variations may of course be devised given the above description of preferred embodiments for implementing the principles in the present disclosure. It is intended that all such modifications and variations be considered as within the spirit and scope of this disclosure, as defined in the following claims.

The invention claimed is:

1. An improved strain wave drive system comprising:
   an outer circular spline part and an outer dynamic spline part spaced apart by a gap from each other in a widthwise (axial) direction and each having an array of internally facing gear teeth of predetermined and different numbers,
   a two-part inner flexible spline (flexspline) having two different sets of externally facing toothed projections offset by a gap from each other across a width extending in the widthwise (axial) direction,
   a wave generator coupled to a central rotor or shaft for generating a wave impulse that displaces the toothed projections of the two-part inner flexspline into mesh with those of the outer circular spline part and the outer dynamic spline part, and
   an array of roller bearings supporting an inner surface across the width extending in the axial direction of the two-part inner flexspline in rolling line bearing contact.

2. The improved strain wave drive system according to claim 1, wherein the two different sets of toothed projections of the two-part inner flexspline are axially separated by an undercut.

3. The improved strain wave drive system according to claim 1, wherein a first set of flexspline toothed projections are teeth that are formed to engage with the circular spline part and sized to provide strain wave action.

4. The improved strain wave drive system according to claim 1, wherein a second set of flexspline toothed projections are formed to engage with the dynamic spline part.

5. The improved strain wave drive system according to claim 4, wherein the toothed projections are teeth with an involute profile.

6. The improved strain wave drive system according to claim 5, wherein the involute profile is truncated at an added part thereof in order to reduce the height of the teeth.

7. The improved strain wave drive system according to claim 5, wherein the teeth are undercut at a declining part thereof in order to enhance flexibility of the two-part inner flexspline.

8. The improved strain wave drive system according to claim 1, wherein the toothed projections are splines or teeth formed from arc or straight line segments.

9. The improved strain wave drive system according to claim 1, wherein the toothed projections are tapered or truncated in an axial direction.

10. The improved strain wave drive system according to claim 1, wherein the toothed projections have one or more radiuses at axial ends thereof.

11. The improved strain wave drive system according to claim 1, wherein the toothed projections are formed on a circumference at an open end of a cup-shaped housing.

12. The improved strain wave drive system according to claim 11, wherein the two sets of toothed projections, relative to the open end of the cup-shaped housing, are reversed.

13. The improved strain wave drive system according to claim 1, wherein the wave generator is comprised of an elliptical plug and a thin-walled race for the roller bearings.

14. The improved strain wave drive system according to claim 1, wherein the two-part inner flexspline is integrated with the wave generator.

15. The improved strain wave drive system according to claim 1, wherein the roller bearings are formed as cylindrical roller bearings having a cylinder length substantially the same as the width extending in the axial direction of the two-part inner flexspline.

16. The improved strain wave drive system according to claim 1, wherein the roller bearings are replaced by one or more sets of ball bearings.

* * * * *